US011067413B2

(12) United States Patent
Yoshiya

(10) Patent No.: US 11,067,413 B2
(45) Date of Patent: *Jul. 20, 2021

(54) ROTATION ANGLE DETECTOR

(71) Applicant: MELEXIS TECHNOLOGIES SA, Bevaix (CH)

(72) Inventor: Takumi Yoshiya, Tokyo (JP)

(73) Assignee: MELEXIS TECHNOLOGIES SA, Bevaix (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/901,776

(22) Filed: Jun. 15, 2020

(65) Prior Publication Data
US 2020/0309567 A1    Oct. 1, 2020

Related U.S. Application Data

(63) Continuation of application No. 16/017,327, filed on Jun. 25, 2018, now Pat. No. 10,718,634.

(30) Foreign Application Priority Data

Jun. 26, 2017  (JP) .............................. JP2017-123981

(51) Int. Cl.
*G01D 5/14*    (2006.01)

(52) U.S. Cl.
CPC ................... *G01D 5/145* (2013.01)

(58) Field of Classification Search
CPC ........ G01D 5/2046; G01D 5/145; G01D 5/12; G01D 5/2451; G01B 7/312; G01B 7/30;
(Continued)

(56) References Cited

U.S. PATENT DOCUMENTS 9,518,844 B2   12/2016  Ueda et al.
9,851,221 B2   12/2017  Lang et al.
(Continued)

FOREIGN PATENT DOCUMENTS

JP    2007-010449 A    1/2007
JP    2010-107440 A    5/2010
(Continued)

OTHER PUBLICATIONS

Office Action from corresponding Japanese Application No. 2017-123982, dated Feb. 6, 2019, 7 Pages.
(Continued)

*Primary Examiner* — Melissa J Koval
*Assistant Examiner* — Trung Q Nguyen
(74) *Attorney, Agent, or Firm* — Workman Nydegger

(57) ABSTRACT

A rotation angle detector includes a magnet arranged to rotate, and a magnetic detection circuit provided with a first pair of magnetic detection elements arranged to be in combination sensitive to a first magnetic field in circumferential direction to the first surface and to a second magnetic field in normal direction to the first surface and arranged away from the rotation axis, and configured to detect magnetic flux of the magnet. A second pair of magnetic detection elements are arranged to be in combination sensitive to the first magnetic field in circumferential direction to the first surface and to the second magnetic field in normal direction to the first surface. A signal processing unit is configured to output a signal representative of a rotation angle of the magnet based on outputs of the first and second pair of magnetic detection elements.

15 Claims, 13 Drawing Sheets

(58) Field of Classification Search
CPC .... G01R 33/098; G01R 33/09; G01R 33/022; G01P 3/44; G01L 1/142
USPC ........ 324/200, 207.2–207.23, 205, 210, 219, 324/228, 244, 252, 262, 500, 750.12, 324/750.21, 754.17, 754.29
See application file for complete search history.

(56) References Cited

U.S. PATENT DOCUMENTS

| | | | |
|---|---|---|---|
| 10,302,461 B2 | 5/2019 | Yoshiya | |
| 10,578,420 B2* | 3/2020 | Yoshiya | G01B 7/30 |
| 10,718,634 B2* | 7/2020 | Yoshiya | G01D 5/145 |
| 2009/0058407 A1 | 3/2009 | Kanekawa et al. | |
| 2011/0025311 A1 | 2/2011 | Chauvin et al. | |
| 2013/0035896 A1 | 2/2013 | Ueda et al. | |
| 2016/0041007 A1 | 2/2016 | Lang et al. | |
| 2018/0031392 A1 | 2/2018 | Yoshiya | |
| 2018/0087888 A1* | 3/2018 | Ausserlechner | G01D 5/145 |
| 2018/0231399 A1* | 8/2018 | Okumura | G01B 7/30 |
| 2018/0274944 A1 | 9/2018 | Yoshiya | |

FOREIGN PATENT DOCUMENTS

| | | |
|---|---|---|
| JP | 2012-037243 A | 2/2012 |
| JP | 2016-514833 A | 5/2016 |
| JP | 2016-102659 A | 6/2016 |
| JP | 2016-145813 A | 8/2016 |
| JP | 2016-156682 A | 9/2016 |
| JP | 2017-067480 A | 4/2017 |
| JP | 2017-067695 A | 4/2017 |
| WO | 2011/129190 A1 | 10/2011 |

OTHER PUBLICATIONS

Office Action from corresponding Japanese Application No. 2017-123982, dated Oct. 25, 2018, 9 Pages.

* cited by examiner

ROTATION ANGLE DETECTOR

FIELD OF THE INVENTION

The present invention is generally related to the field of rotation angle detectors, attitude control devices, automatic steering devices and throttle devices.

BACKGROUND OF THE INVENTION

As a conventional technology, there has been proposed a rotation angle detector that reduces an influence of magnetic noise on an output signal when detecting a direction of a rotating magnetic field (e.g., see JP 2007-10449 A).

A rotation angle detector disclosed in JP 2007-10449 A or JP 2016-514833 A has a sensor disposed with a pair of magnetic detection elements in a plurality of directions with respect to a rotating magnetic field, and a signal processing part that processes a signal output from each magnetic detection element of the sensor and outputs a signal corresponding to an angle of the magnetic field. In the rotation angle detector, the signal processing part specifies an influence of magnetic noise by comparing a phase and an amplitude of each output of the pair of magnetic detection elements when the magnetic field is rotated, and outputs a signal with reduced influence of magnetic noise by subtracting the influence of the magnetic noise, or by performing calculation processing such as averaging individual outputs of the pair of magnetic detection elements.

However, although the rotation angle detector of JP 2007-10449 A or JP 2016-514833 A outputs a signal with reduced influence of magnetic noise, it is necessary to arrange magnetic detection elements in a plurality of directions with respect to the rotating magnetic field, causing a problem that a shape of a sensor cannot be made smaller than at least a region where the magnetic detection elements are disposed. In addition, it is necessary to make a rotation centre of the rotating magnetic field substantially coincide with a centre of the rotation angle detector, causing a problem that an arrangement of the rotation angle detector is limited.

Hence, there is a need for a rotation angle detector wherein at least one of these drawbacks is avoided or overcome.

SUMMARY OF THE INVENTION

It is an object of embodiments of the present invention to provide for a rotation angle detector, an attitude control device, an automatic steering device and a throttle device that are to detect a rotation angle, with a reduced size and reduced restriction on the arrangement as compared to conventional ones.

The above objective is accomplished by the solution according to the present invention.

In a first aspect the invention relates to the following rotation angle detector, attitude control device, automatic steering device and throttle device. A rotation angle detector according to the invention includes:
   a magnet arranged to rotate; and
   a magnetic detection IC provided with a first pair of magnetic detection elements that have a normal line of a detection surface in parallel with a rotation axis direction of the magnet, are arranged in a region overlapping with the magnet, other than on a rotation axis in a plan view in which the rotation axis direction is a normal direction, and are configured to detect magnetic flux of the magnet, a second pair of magnetic detection elements arranged with a predetermined interval from the first pair of magnetic detection elements in a circumferential direction of rotation, and a signal processing part configured to output a signal corresponding to a rotation angle of the magnet based on outputs of the first pair of magnetic detection elements and the second pair of magnetic detection elements.

In a preferred embodiment of the rotation angle detector the signal processing part determines a first magnetic flux density difference in the rotation axis direction and a second magnetic flux density difference in the circumferential direction of the rotation, from outputs of the first pair of magnetic detection elements and the second pair of magnetic detection elements, and outputs a signal corresponding to the rotation angle of the magnet based on the first magnetic flux density difference and the second magnetic flux density difference.

In the rotation angle detector the signal processing part preferably determines a maximum value of an amplitude of the first magnetic flux density difference and a maximum value of an amplitude of the second magnetic flux density difference based on a rate of change in the amplitudes of the first magnetic flux density difference and the second magnetic flux density difference, and normalizes the amplitude of the first magnetic flux density difference and the amplitude of the second magnetic flux density difference in accordance with the maximum value of the amplitude of the first magnetic flux density difference and the maximum value of the amplitude of the second magnetic flux density difference.

The invention also relates to a rotation angle detector including:
   a magnet that rotates;
   a magnetic detection IC provided with a first two pairs of magnetic detection elements that have a normal line of a detection surface in parallel with a rotation axis direction of the magnet, are arranged in a region overlapping with the magnet, other than on a rotation axis in a plan view in which the rotation axis direction is a normal direction, and are configured to detect magnetic flux of the magnet, a second two pairs of magnetic detection elements arranged with a predetermined interval from the first two pairs of magnetic detection elements in a circumferential direction of rotation, and a signal processing unit configured to output a signal corresponding to a rotation angle of the magnet based on outputs of the first two pairs of magnetic detection elements and the second two pairs of magnetic detection elements.

In embodiments of the rotation angle detector the signal processing unit determines a third magnetic flux density difference in a radial direction of the rotation and a second magnetic flux density difference in the circumferential direction of the rotation, from outputs of the first two pairs of magnetic detection elements and the second two pairs of magnetic detection elements, and outputs a signal corresponding to the rotation angle of the magnet based on the third magnetic flux density difference and the second magnetic flux density difference.

In further embodiments the signal processing unit determines a maximum value of an amplitude of the third magnetic flux density difference and a maximum value of an amplitude of the second magnetic flux density difference based on a rate of change in the amplitudes of the third magnetic flux density difference and the second magnetic flux density difference, and normalizes the amplitude of the third magnetic flux density difference and the amplitude of the second magnetic flux density difference in accordance with the maximum value of the amplitude of the third magnetic flux density difference and the maximum value of the amplitude of the second magnetic flux density difference.

In preferred embodiments the magnet has a magnetization direction in a direction orthogonal to the rotation axis.

In other preferred embodiments the magnet is divided into two parts by a plane passing through the rotation axis and the two parts are parallel to the rotation axis direction and magnetized in mutually opposite directions.

Advantageously the magnet is divided into a plurality of parts by a plane passing through the rotation axis according to a rotation angle to be detected, and the plurality of parts are parallel to the rotation axis direction and magnetized in mutually opposite directions.

In certain embodiments the magnet is formed only at a partial angle around a central axis.

In another aspect the invention also relates to a rotation angle detector including:
  a magnet that rotates;
  a magnetic detection IC provided with a first pair of magnetic detection elements that have a normal line of a detection surface in parallel with a rotation axis direction of the magnet, are arranged in a region not overlapping with the magnet in a plan view in which the rotation axis direction is a normal direction, and are configured to detect magnetic flux of the magnet, a second pair of magnetic detection elements arranged with a predetermined interval from the first pair of magnetic detection elements in a circumferential direction of rotation, and a signal processing unit configured to output a signal corresponding to a rotation angle of the magnet based on outputs of the first pair of magnetic detection elements and the second pair of magnetic detection elements.

In yet a further aspect the invention relates to a rotation angle detector including:
  a magnet that rotates;
  a magnetic detection IC provided with a first pair of magnetic detection elements that have a normal line of a detection surface in a circumferential direction with respect to a rotation axis of the magnet, are arranged in a region not overlapping with the magnet in a plan view in which the rotation axis direction is a normal direction, are arranged in a region overlapping with the magnet in a plan view in which a direction orthogonal to the rotation axis is a normal line, and are configured to detect magnetic flux of the magnet, a second pair of magnetic detection elements arranged with a predetermined interval from the first pair of magnetic detection elements in a circumferential direction of rotation, and a signal processing unit configured to output a signal corresponding to a rotation angle of the magnet based on outputs of the first pair of magnetic detection elements and the second pair of magnetic detection elements.

The invention also relates to an attitude control device including the rotation angle detector as previously described.

The invention also relates to an automatic steering device including the rotation angle detector as previously described.

The invention also relates to a throttle device including the rotation angle detector as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIGS. 7(a1) to 7(a5) are front views and FIGS. 7(b1) to 7(b5) are plan views.

DETAILED DESCRIPTION OF ILLUSTRATIVE EMBODIMENTS

Figure 1:
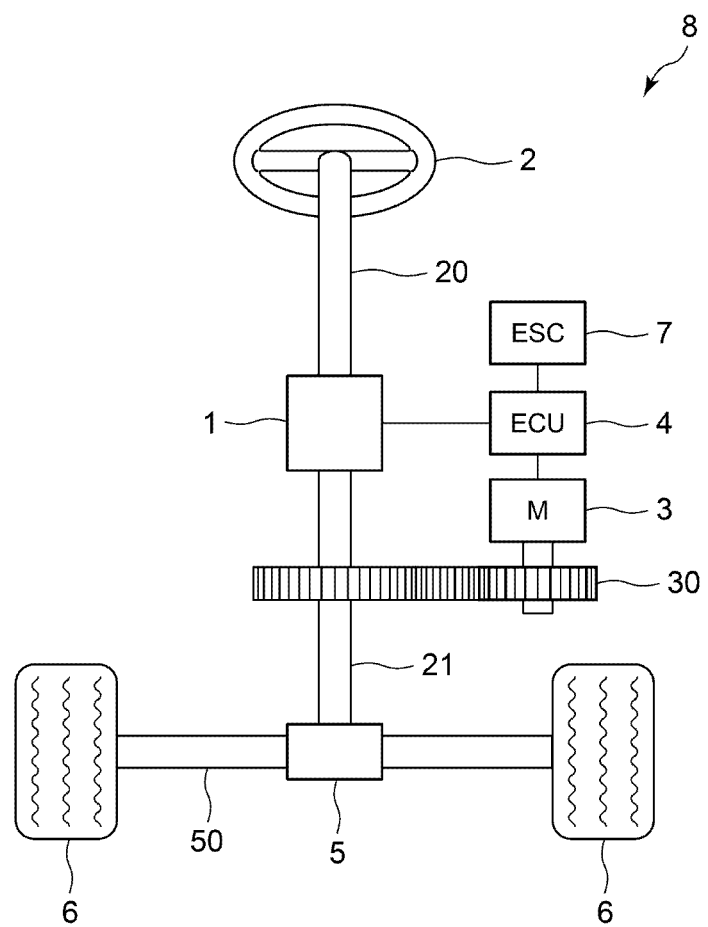
FIG. 1 illustrates a schematic view showing a configuration example of a steering system according to a first embodiment of this invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

FIG. 1 represents a schematic view of a configuration example of a steering system according to a first embodiment. A steering system 8 has a rotation angle detector 1 configured to detect a steering angle of a steering shaft 20 and output a detection signal, a steering wheel 2 connected to one end of the steering shaft 20, a motor 3 configured to rotate a column shaft 21 via a speed reduction gear 30 for automating steering of the steering wheel 2, an electric control unit (ECU) 4 configured to control an operation of the motor 3 in accordance with an output of the rotation angle detector 1, and/or to output information on the steering angle to an electronic stability control (ESC) 7; a pinion gear 5 configured to convert rotational motion of the column shaft 21 into linear motion of a rack shaft 50; a wheel 6 connected to the rack shaft 50 via a tie rod (not shown) or the like; and the ESC 7 configured to stabilize an attitude at a time of turning of a vehicle, to prevent sideslip.

In the above configuration rotation of the steering wheel 2 by a driver causes rotation of the steering shaft 20 connected to the steering wheel 2. The rotation of the steering shaft 20 causes an accompanying rotation of the column shaft 21. The rotation of the column shaft 21 causes a displacement of the rack shaft 50 via the pinion gear 5, changes an angle of a pair of wheels 6 in accordance with the displacement amount of the rack shaft 50.

The rotation angle detector 1 detects the steering angle of the steering shaft 20 and outputs a detection signal corresponding to the detected steering angle. When the detection signal is input from the rotation angle detector 1, the ECU 4 calculates the steering angle of the steering shaft 20 in accordance with the detection signal, and outputs information on the steering angle to the ESC 7. The ESC 7 stabilizes an attitude of a vehicle at a time of turning by controlling a brake and an engine output in accordance with the information on the input steering angle.

Further, in automating the steering of the vehicle the ECU 4 controls the motor 3 in accordance with the detection signal when the detection signal of the rotation angle detector 1 is input. The rotation of the motor 3 is decelerated by the speed reduction gear 30, to rotate the column shaft 21 to operate the steering wheel 2. It should be noted that an output of the motor 3 may be directly transmitted to the rack shaft 50 without passing through the column shaft 21.

Figure 2:
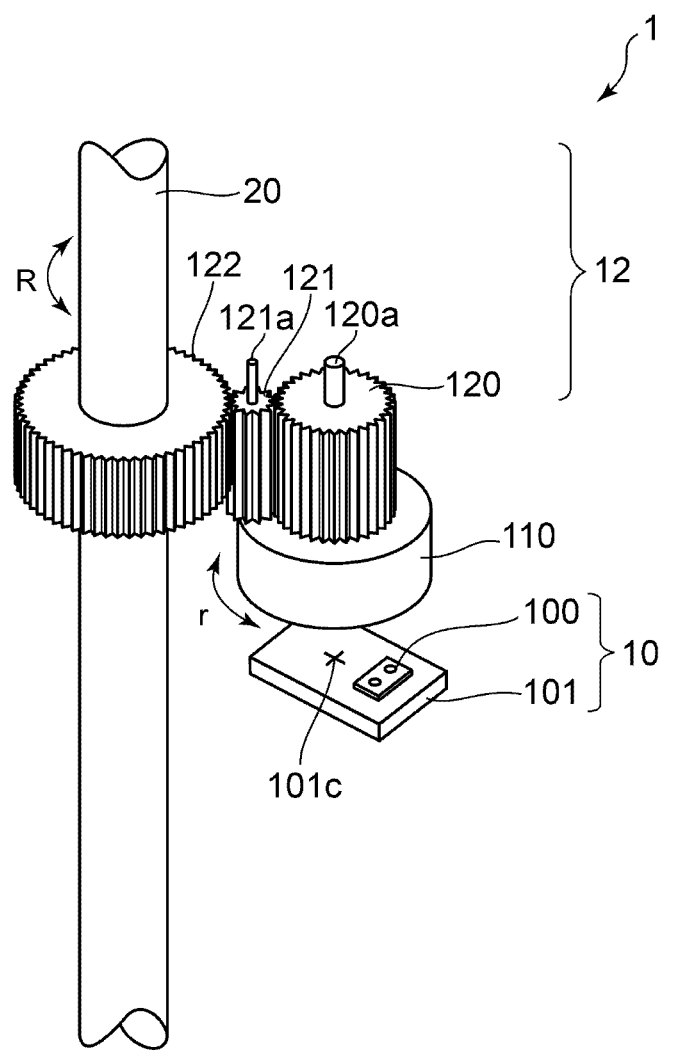
FIG. 2 is an exploded perspective view showing a configuration example of a rotation angle detector according to the first embodiment.
Figure 3A:
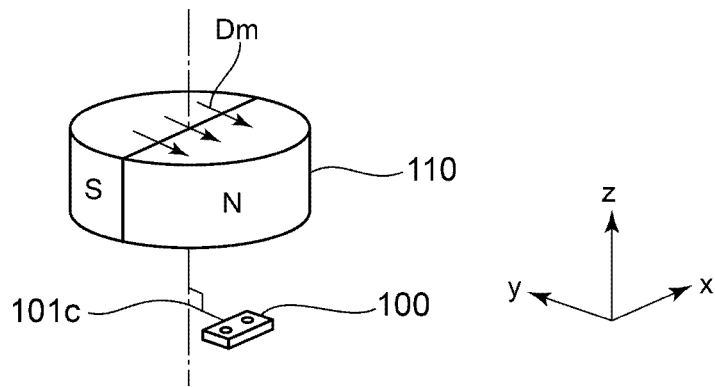
FIGS. 3(a) to 3(c) are a perspective view, a plan view and a front view explaining a positional relationship between a Hall IC and a magnet.
Figure 3B:
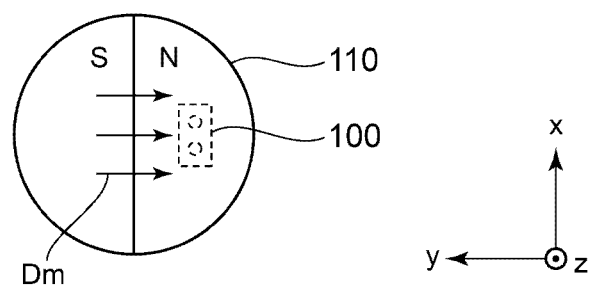
Figure 3C:
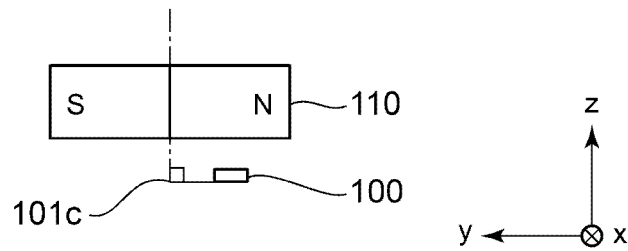

FIG. 2 is an exploded perspective view showing a configuration example of a rotation angle detector 1 according to the first embodiment. FIGS. 3(a) to 3(c) are a perspective view, a plan view and a front view for explaining a positional relationship between a Hall IC 100 and a magnet 110.

The rotation angle detector 1 has a magnetic detector 10 mounted with the Hall IC 100 on a substrate 101, a columnar magnet 110 connected to the steering shaft 20 via a gear part 12, and configured to rotate in r direction along with rotation of the steering shaft 20 in R direction.

The magnetic detector 10 is arranged such that a mounting surface of the substrate 101 faces a bottom surface of the magnet 110. A point 101c on the substrate 101 is a point that coincides with a rotation axis of the magnet 110. The Hall IC 100 is arranged at a position offset from the point 101c with its centre of magnetic detection not coinciding with the point 101c on the substrate 101.

The magnet 110 is magnetized parallel to the bottom surface (upper surface) of a cylindrical column, and rotates magnetization direction Dm along with the rotation in r direction by rotating around a central axis of the cylindrical column as a rotation axis. The rotation of the magnet 110 changes the magnetic field at a magnetic detection point of the Hall IC 100. A specific change in the magnetic field will be described later in FIGS. 7(a1) to 7(a5) and 7(b1) to 7(b5).

The gear part 12 includes a gear 120 configured to rotate around a shaft 120a along with the magnet 110, a gear 121 configured to rotate around the shaft 121a, and a gear 122 configured to rotate along with the steering shaft 20. The gear part 12 is accommodated in a case (not shown), and the shafts 120a and 121a are held in holes provided on an inner wall of the case. The magnetic detector 10 may be accommodated in the case or may be disposed outside the case as long as the case is a non-magnetic body.

As an example, the Hall IC 100 is disposed at a position separated by 5 mm from the bottom surface of the magnet 110, and at a position separated by 2 mm from the point 101c in the radial direction.

The magnet 110 is a permanent magnet formed by using a material such as ferrite, samarium cobalt, neodymium or the like. A size of the magnet is, for example, 10 mm in outer diameter and 5 mm in height.

Figure 4A:
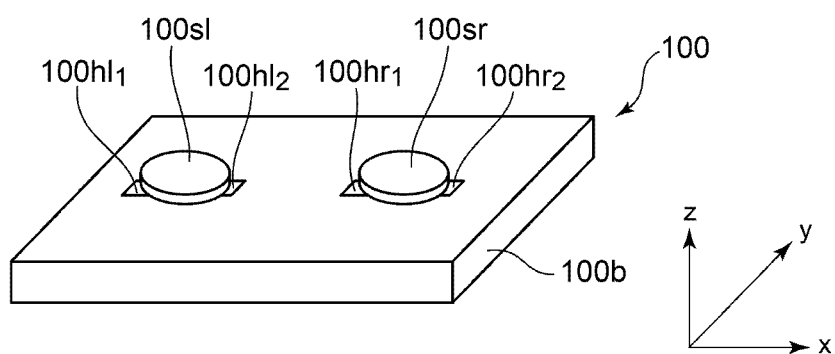
FIGS. 4(a) to 4(c) shows a perspective view, a plan view and a cross-sectional view showing a configuration of the Hall IC.
Figure 4B:
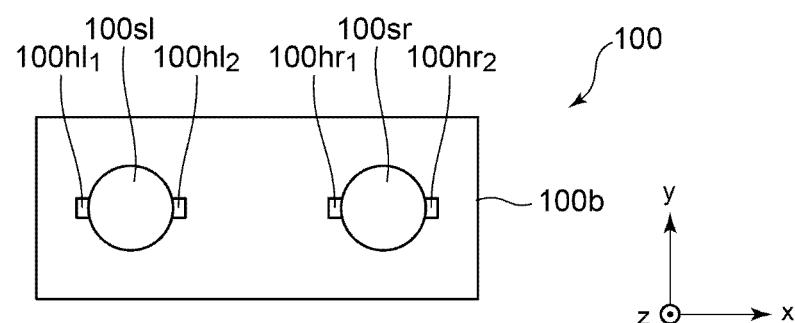
Figure 4C:
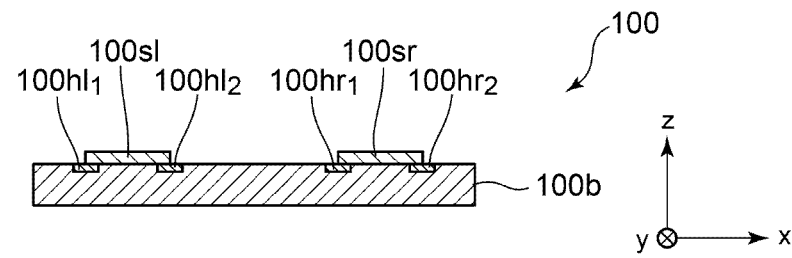

FIGS. 4(a) to 4(c) are a perspective view, a plan view and a cross-sectional view showing a configuration of the Hall IC 100.

The Hall IC 100 comprises: a substrate 100b; Hall plates 100$hl_1$ and 100$hl_2$ (also collectively referred to as a Hall plate 100hl) (a first pair of magnetic detection elements) and Hall plates 100$hr_1$ and 100$hr_2$ (also collectively referred to as a Hall plate 100hr) (a second pair of magnetic detection elements) being provided on the substrate 100b to have a detection surface parallel to the surface of the substrate 100b, and having a detection direction in a normal direction of the surface of the substrate 100b, as a magnetic detection element; a magnetic concentrator 100sl provided on the substrate 100b to overlap on a part of each of the Hall plates 100$hl_1$ and 100$hl_2$, and configured to convert magnetic flux in the direction orthogonal to the normal direction into the normal direction to allow the magnetic flux to be detected by the Hall plates 100$hl_1$ and 100hl2; a magnetic concentrator 100sr provided on the substrate 100b to overlap on a part of each of the Hall plates 100$hr_1$ and 100$hr_2$, and configured to convert magnetic flux in the direction orthogonal to the normal direction into the normal direction to allow the magnetic flux to be detected by the Hall plates Hall plates 100$hr_1$ and 100$hr_2$; and a signal processing part (100sp, FIG. 5) configured to process signals output from the Hall plates 100hl and 100hr, in which the Hall IC 100 detects a magnetic flux density in the normal direction and the direction orthogonal to the normal direction through signal processing described next.

For example, MLX 90371 or the like made by Melexis Technologies NV is used for the Hall IC 100, a distance between the Hall plates 100$hl_1$ and 100$hl_2$ is 0.2 mm, a thickness is 0.5 mm, a width in y direction is 2 mm, and a width in x direction is 3 mm. For the magnetic concentrator 100sl, permalloy can be used. Further, the Hall plate 100hl and the Hall plate 100hr are separated by 2 mm to be arranged. The widths in x direction and y direction of the Hall IC 100 above are a size in consideration of layout of the signal processing part or the like, and are fitted within a size of 0.2 mm in y direction and 2.4 mm in x direction when only the Hall plate 100hl and the Hall plate 100hr are arranged.

Figure 5:
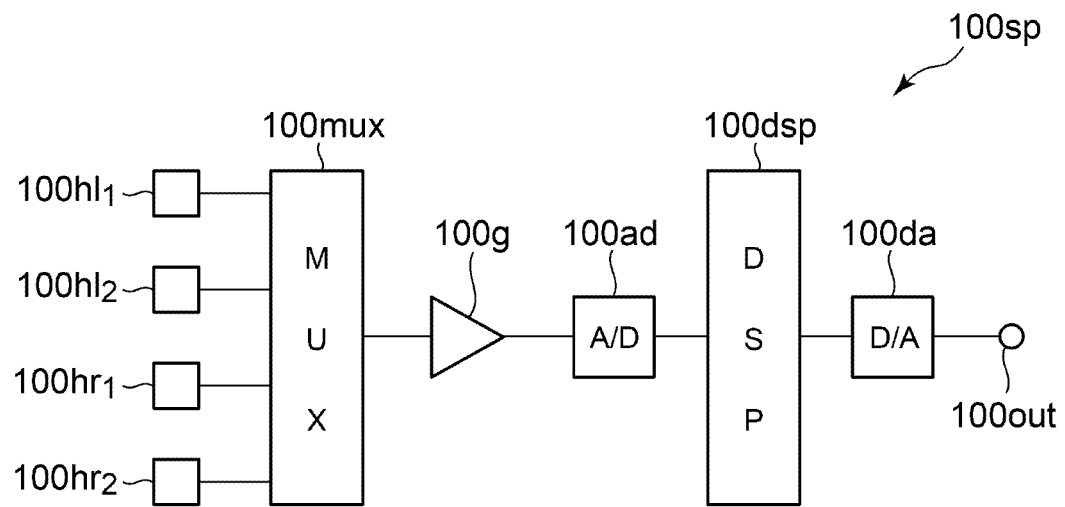
FIG. 5 illustrates a block diagram showing a configuration of a signal processing part of the Hall IC.

FIG. 5 is a block diagram showing a configuration of a signal processing part of the Hall IC 100. The signal processing part 100sp of the Hall IC 100 has: a multiplexer 100mux configured to sequentially output outputs from the Hall plates 100$hl_1$, 100$hl_2$, 100$hr_1$, and 100$hr_2$ to subsequent stages; an amplifier 100g configured to amplify the output of the multiplexer 100mux; an A/D converter 100ad configured to convert an analog signal output from the amplifier 100g into a digital signal; a digital signal processor 100dsp configured to process the digital signal input from the A/D converter 100ad; a D/A converter 100da configured to convert the digital signal output from the digital signal processor 100dsp into an analog signal; and an output 100out configured to output the analog signal converted by the D/A converter 100da, to the ECU 4.

The digital signal processor 100dsp calculates the outputs from the Hall plates 100$hl_1$, 100$hl_2$, 100$hr_1$, and 100$hr_2$, and stores necessary information. The digital signal processor 100dsp adds and subtracts the outputs of the Hall plates 100$hl_1$ and 100$hl_2$, adds and subtracts the outputs of the Hall plates 100$hr_1$ and 100$hr_2$, and then determines a rotation angle of the magnet 110 by using the calculation results. A detailed calculation method will be described later.

Figure 6:
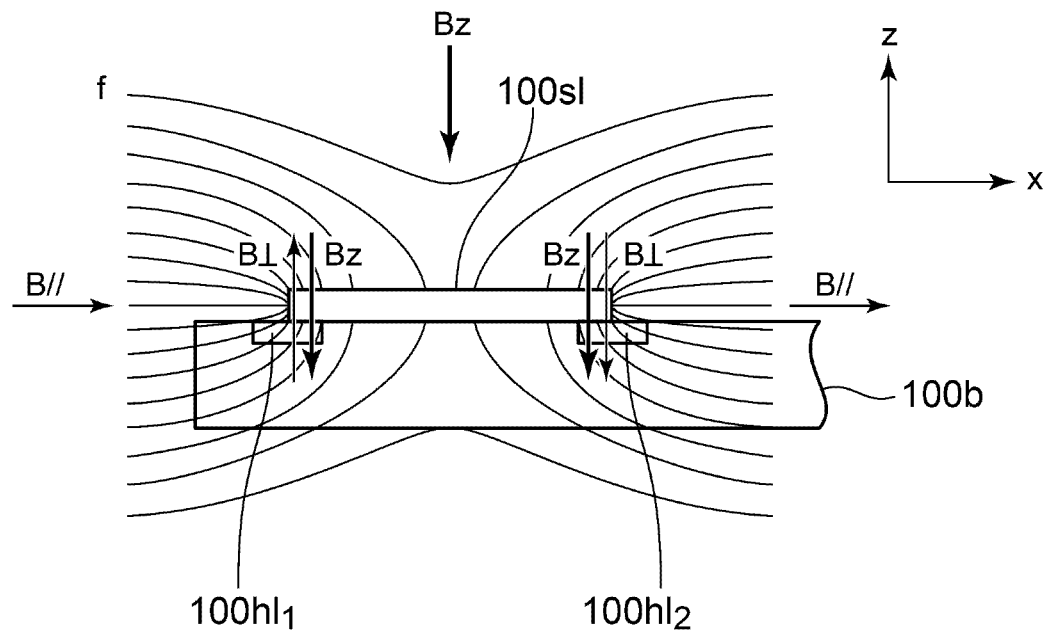
FIG. 6 illustrates a schematic cross-sectional view to explain a magnetic-flux detection operation of the Hall IC.

FIG. 6 is a schematic cross-sectional view for explaining a magnetic-flux detection operation of the Hall IC 100. In the Hall plates of the Hall IC 100, the Hall plates 100$hl_1$ and 100$hl_2$ detect the magnetic flux density in a vertical direction of the drawing. When a horizontal component of the drawing of magnetic flux f is B//(Bx) and a vertical component of the drawing is Bz, horizontal component B// of the drawing is induced by the magnetic concentrator 100sl and detected as B⊥, so that the Hall plate 100$hl_1$ detects "B⊥−Bz" and the Hall plate 100$hl_2$ detects "−B⊥−Bz".

Therefore, a signal proportional to magnetic flux density 2B⊥ (hereinafter referred to as "Bxl") is obtained by taking a difference between the outputs of the Hall plates 100$hl_1$ and 100$hl_2$ with the signal processing part 100sp, and a signal proportional to magnetic flux density −2Bz (hereinafter referred to as "Bzl") is obtained by taking a sum of the outputs of the Hall plates 100$hl_1$ and 100$hl_2$.

The operation of the Hall plates 100$hl_1$ and 100$hl_2$ described above can be similarly explained for the Hall plates 100$hr_1$ and 100$hr_2$. A signal proportional to magnetic flux density 2B⊥ (hereinafter referred to as "Bxr") is obtained by taking a difference between the outputs of the Hall plates 100$hr_1$ and 100$hr_2$ with the signal processing part 100sp, and a signal proportional to magnetic flux density −2Bz (hereinafter referred to as "Bzr") is obtained by taking a sum of the outputs of the Hall plates 100$hr_1$ and 100$hr_2$.

Since the Hall plate 100hl and the Hall plate 100hr are arranged separated by 2 mm, the Hall plate 100hl and the Hall plate 100hr each detect positionally different magnetic fields. Therefore, the difference between the outputs of the Hall plate 100hl and the Hall plate 100hr is calculated as ΔBx=Bxl−Bxr (a second magnetic flux density difference), and ΔBz=Bzl−Bzr (a first magnetic flux density difference). ΔBx and ΔBz change along with the rotation angle of the magnet 110, and their correspondence will be described with reference to FIGS. 7(a1) to 7(a5) and 7(b1) to 7(b5) and 8(a) and 8(b).

Figure 7:
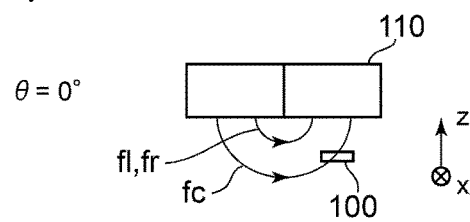
FIGS. 7(a1) to 7(a5) and 7(b1) to 7(b5) are schematic diagrams showing a relationship between a rotation angle of the magnet and magnetic flux to be detected by the Hall IC.
Figure 7:
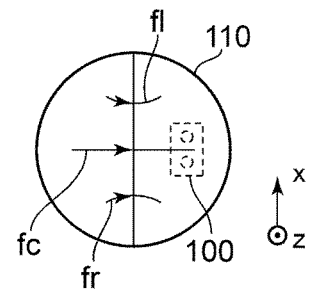
Figure 7:
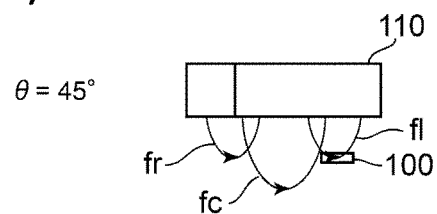
Figure 7:
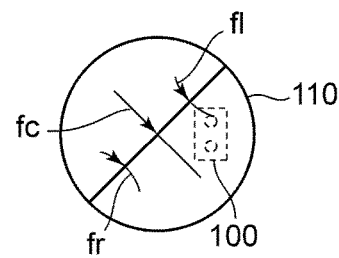
Figure 7:
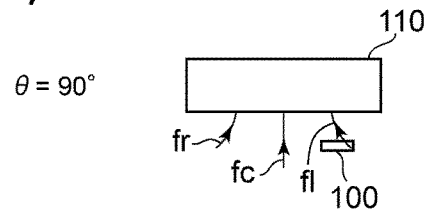
Figure 7:
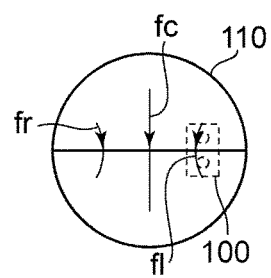
Figure 7:
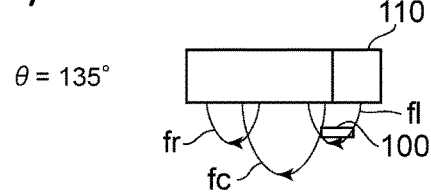
Figure 7:
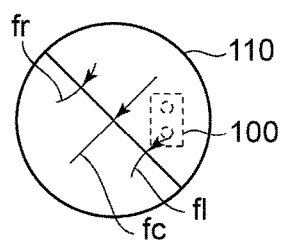
Figure 7:
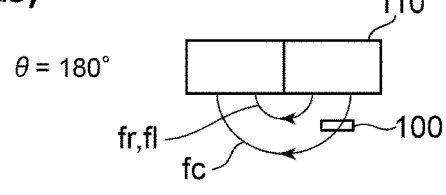
Figure 7:
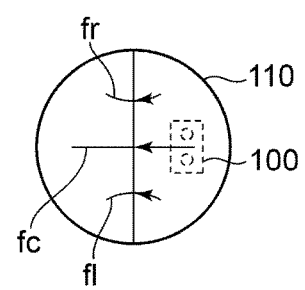
Figure 8A:
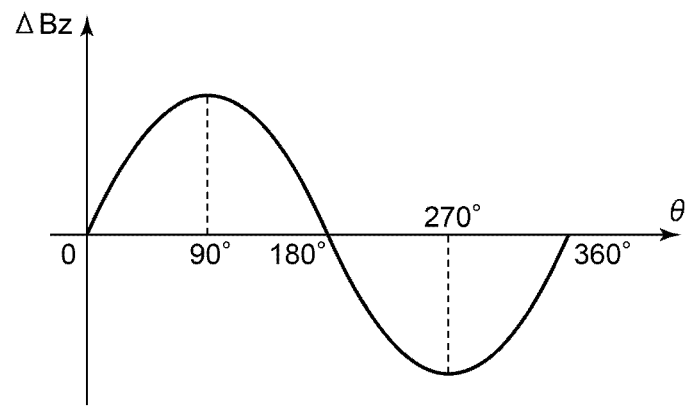
FIGS. 8(a) and 8(b) are graphs showing outputs ΔBz and ΔBx of the Hall IC, each relative to a rotation angle of the magnet.
Figure 8B:
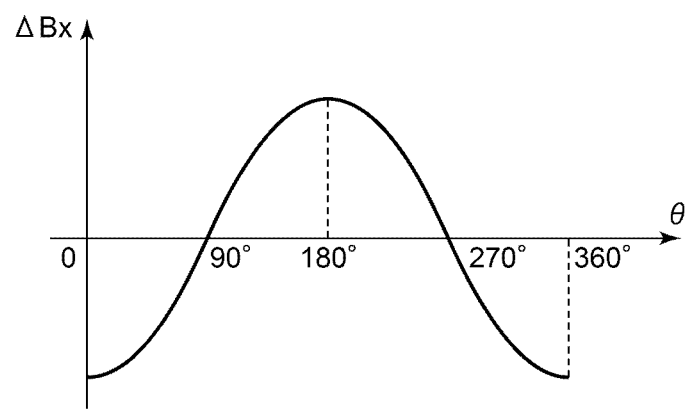

FIGS. 7(a1) to 7(a5) and 7(b1) to 7(b5) are schematic diagrams showing a relationship between a rotation angle of the magnet 110 and magnetic flux to be detected by the Hall IC 100, in which FIGS. 7(a1) to 7(a5) are front views and FIGS. 7(*b*1) to 7(*b*5) are plan views. FIGS. 8(*a*) and 8(*b*) are graphs showing outputs ΔBz and ΔBx of the Hall IC 100, each relative to the rotation angle of the magnet 110.

When the rotation angle of the magnet 110 is θ=0° (FIGS. 7(*a*1) and 7(*b*1)), magnetic fields Bzl and Bzr detected by the Hall plate 100*hl* and the Hall plate 100*hr*, respectively, have same numerical values. Therefore, ΔBz equals 0. Moreover, magnetic fields Bxl and Bxr detected by the Hall plate 100*hl* and the Hall plate 100*hr*, respectively, have the same numerical values with reverse signs. Therefore, ΔBx has a negative maximum value.

Next, when the rotation angle of the magnet 110 is θ=90° (FIGS. 7(*a*3) and 7(*b*3)), magnetic fields Bzl and Bzr detected by the Hall plate 100*hl* and the Hall plate 100*hr*, respectively, have same numerical values with reverse signs. Therefore, ΔBz has a positive maximum value. Moreover, magnetic fields Bxl and Bxr detected by the Hall plate 100*hl* and the Hall plate 100*hr*, respectively, have same numerical values. Therefore, ΔBx=0.

Next, when the rotation angle of the magnet 110 is θ=180° (FIGS. 7(*a*5) and 7(*b*5)), magnetic fields Bzl and Bzr respectively detected by the Hall plate 100*hl* and the Hall plate 100*hr* have same numerical values. Therefore, ΔBz=0. Moreover, magnetic fields Bxl and Bxr detected by the Hall plate 100*hl* and the Hall plate 100*hr*, respectively, have same numerical values with reverse signs (opposite to the case of θ=0°). Therefore, ΔBx has a positive maximum value.

Considering the behaviour of ΔBz and ΔBx above, transition states θ=45° (FIGS. 7(*a*2) and 7(*b*2)), θ=135° (FIGS. 7(*a*4) and 7(*b*4)) and θ=180° to 360°, a relationship between rotation angle θ of the magnet 110 and ΔBz and ΔBx is such that ΔBz is proportional to sin θ and ΔBx is proportional to cos θ, as shown in FIGS. 8(*a*) and 8(*b*).

Namely, ΔBz/ΔBx=k·sin θ/cos θ=k·tan θ, so that θ=arctan (K·ΔBz/ΔBx). Note that k is a constant for normalizing a magnitude of the amplitude of ΔBz and ΔBx and K is the reciprocal of k.

The digital signal processor 100*dsp* of the signal processing part 100*sp* obtains outputs from the Hall plates 100*hl*$_1$, 100*hl*$_2$, 100*hr*$_1$ and 100*hr*$_2$ as digital signals via the multiplexer 100*mux*, the amplifier 100*g* and the A/D converter 100*ad*, and calculates θ from the outputs obtained based on the above-described calculation method.

The θ calculated by the digital signal processor 100*dsp* is converted from a digital signal to an analog signal by the D/A converter 100*da*, and the analog signal converted by the D/A converter 100*da* is output from the output 100out to the ECU 4.

Since it is necessary to determine k (or K) for calculating θ, the digital signal processor 100*dsp* has a calibration mode for determining k (or K). When the magnet 110 is rotated 360° in the calibration mode, the digital signal processor 100*dsp* records ΔBz and ΔBx. Next, the digital signal processor 100*dsp* calculates k (or K) from the respective maximum values ΔBzmax and ΔBxmax.

Further, as another example of the method for determining the maximum values ΔBzmax and ΔBxmax, the digital signal processor 100*dsp* may determine ΔBzmax and ΔBxmax from differentiation of ΔBz and ΔBx (with respect to θ or time), namely, from ΔBz and ΔBx of an angle or timing at which an inclination becomes zero.

According to the above-described embodiment, since the Hall IC 100 detects the rotation of the magnet 110 by using the difference of the magnetic field in x direction and the magnetic field in z direction between two points, the Hall plates only need to be arranged in a single direction with respect to the rotating magnetic field and the Hall plates do not need to be arranged in a plurality of directions, enabling a compact IC compared with a conventional one.

Further, the Hall IC 100 does not need to be arranged directly under a rotation centre of the magnet 110, but the Hall IC 100 can be arranged at a position offset from the rotation centre, achieving less restriction on arrangement than a conventional one. In addition, since the Hall IC 100 can be arranged at a position offset from the rotation centre, the gear part 12 can be omitted by providing a cylindrical magnet on the steering shaft 20 and arranging the Hall IC 100 with respect to the magnet. The cylindrical magnet will be described later (FIGS. 11(*a*) and 11(*b*)).

A second embodiment is different from the first embodiment in that a magnet 110 has a semicircular cylindrical shape and the range of rotation angles to be detected is 180°. Further, the second embodiment is applied to a throttle device such as a motorcycle or a scooter. The same reference numerals are given to the same configurations as those of the first embodiment.

Figure 9:
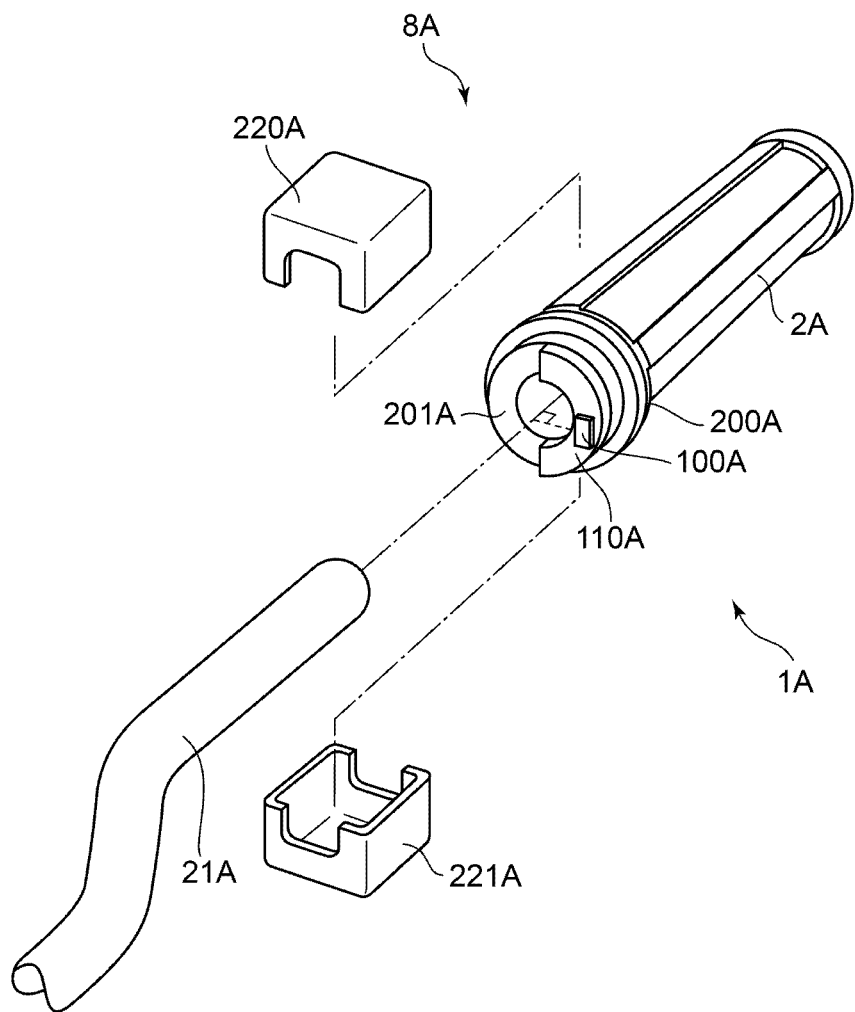
FIG. 9 provides an exploded perspective view showing a configuration example of a rotation angle detector according to a second embodiment.

FIG. 9 is an exploded perspective view showing a configuration example of a rotation angle detector according to the second embodiment. A throttle device 8A is, as an example, for controlling rotation of a motor of an electric motorcycle and comprises: a throttle grip 2A to be gripped by a driver of the electric motorcycle; a cylindrical sleeve 200A configured to rotate while an outer wall of the cylindrical sleeve 200A and an inner wall of the throttle grip 2A are fixed, and an inner wall the cylindrical sleeve 200A and an outer wall of a handlebar 21A slide; a mount 201A provided at one end of the sleeve 200A and configured to fix a magnet 110A; the handlebar 21A configured to steer the motorcycle; and a switch box 22 including a case upper part 220A and a case lower part 221A configured to accommodate a switch, a harness and the like which are not shown, and rotatably hold the sleeve 200A. The rotation angle detector 1A according to the second embodiment has a magnetic detector mounted with a Hall IC 100A on a substrate (not shown) and a semicircular cylindrical magnet 110A that integrally rotates with the throttle grip 2A. A configuration of the magnet 110A including a magnetization direction is shown in FIG. 11(*a*) or 11(*b*) described later.

In the above configuration, when a driver of the electric motorcycle rotates the throttle grip 2A, the sleeve 200A and the magnet 110A fixed to the mount 201A are rotated. The rotation angle detector 1A detects a rotation angle of the throttle grip 2A and outputs a detection signal corresponding to the detected rotation angle. When a detection signal is input from the rotation angle detector 1A, the ECU or the motor control device, which is not shown, calculates a rotation angle and controls the rotation of the motor of the electric motorcycle, in accordance with the detection signal. It should be noted that the throttle grip 2A and the sleeve 200A rotate around the handlebar 21A by less than 180°. FIG. 9 shows a state in which the driver has rotated the throttle grip 2A by 90°.

According to the above-described embodiment, the same effects as those of the first embodiment can be applied to a throttle of an electric motorcycle. In other words, the rotation angle detector 1A with a compact IC as compared with a conventional one can be applied to the throttle device 8A of the electric motorcycle. Further, since the arrangement position can be offset from the rotation centre and the restriction on arrangement can be reduced as compared with a conventional one, the rotation angle detector 1A can be used even when the handlebar 21A occupies a space of the rotation centre.

Figure 11A:
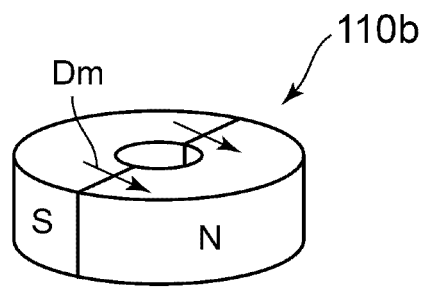
FIGS. 11(a) and 11(b) give perspective views showing modified examples of a shape and a magnetization direction of the magnet.
Figure 11B:
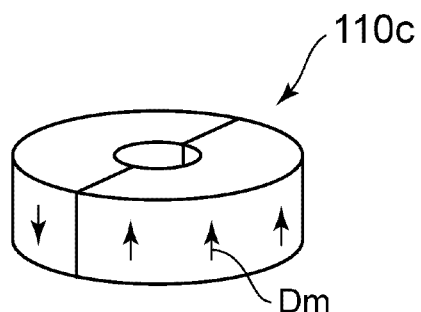

Further, since the magnet 110A is obtained by dividing a cylindrical shape into two parts, the magnet 110A is easily installed on the handlebar 21A as compared with a cylindrical magnet (e.g., a magnet 110b (FIG. 11(a)) or a magnet 110c (FIG. 11(b)). The rotation angle detector 1A can be introduced without requiring a design change of the throttle device or as an alternative component of a component constituting a conventional throttle device.

It should be noted that the present invention is not limited to the embodiment described above. Various modifications can be made without departing from the subject matter of the present invention. For example, the magnet 110 and the magnet 110A may be replaced with the following.

Figure 10A:
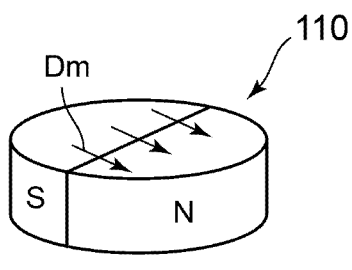
FIGS. 10(a) and 10(b) are perspective views showing a modified example of a magnetization direction of the magnet.
Figure 10B:
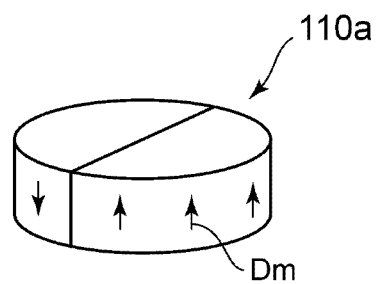

FIGS. 10(a) and 10(b) are perspective views showing a modified example of a magnetization direction of the magnet. The magnet 110 shown in FIG. 10(a) is same as the magnet 110 of the first embodiment, and is shown for comparison with a modified example of other magnet. The magnet 110 has magnetization direction Dm in a direction orthogonal to an axis of a cylindrical column in the columnar shape. A magnet 110a shown in FIG. 10(b) is obtained by dividing a columnar shape into two parts by a plane passing through the axis of a cylindrical column. Magnetization directions Dm of individual parts are parallel to the axial direction of the cylindrical column and are in mutually opposite directions. Since this configuration causes formation of an external magnetic field equivalent to that of the magnet 110 at a magnetic detection position of the Hall IC 100, the magnet 110 may be replaced with the magnet 110a as it is.

FIGS. 11(a) and 11(b) are perspective views showing modified examples of a shape and a magnetization direction of the magnet. The magnet 110b shown in FIG. 11(a) has a cylindrical shape and has magnetization direction Dm in a direction orthogonal to an axis of the cylindrical shape. Since this configuration causes formation of an external magnetic field equivalent to that of the magnet 110 at a magnetic detection position of the Hall IC 100, the magnet 110 may be replaced with the magnet 110b as it is. The magnet 110c shown in FIG. 11(b) has a cylindrical shape and is obtained by dividing the cylindrical shape into two parts by a plane passing through the axis of the cylinder. Magnetization directions Dm of individual parts are parallel to the axial direction of the cylinder and are in mutually opposite directions. Since this configuration causes formation of an external magnetic field equivalent to that of the magnet 110 at a magnetic detection position of the Hall IC 100, the magnet 110 may be replaced with the magnet 110c as it is.

Figure 12A:
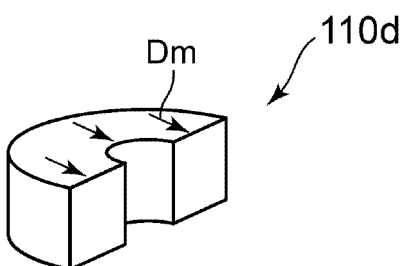
FIGS. 12(a) and 12(b) illustrate perspective views providing modified examples of a shape and a magnetization direction of the magnet.
Figure 12B:
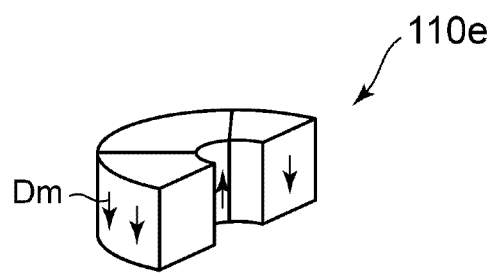

FIGS. 12(a) and 12(b) are perspective views showing modified examples of a shape and a magnetization direction of the magnet. A magnet 110d shown in FIG. 12(a) is one of parts obtained by dividing a cylindrical shape by a plane passing through an axis of the cylinder and has magnetization direction Dm in a direction orthogonal to an axis of the cylindrical shape. Since this configuration causes formation of an external magnetic field equivalent to that of the magnet 110 within a range of a rotation angle of 180° where the magnet 110d and the Hall IC 100 overlap in a plan view with the axis of the cylinder as a normal line, the magnet 110d may be replaced with the magnet 110d when being used within the above-described range of the rotation angle. Further, the magnet 110d can be used as the magnet 110A of the second embodiment. The magnet 110d may be formed not only in a semicircle but also at any angle. The rotation angle can be detected with a rotation angle at which the magnet 110d and the Hall IC 100 overlap in a plan view with the axis of the cylinder as a normal line. A magnet 110e shown in FIG. 12(b) is one of the parts obtained by dividing a cylindrical shape by a plane passing through an axis of the cylinder. The shape is further divided into three parts by a plane passing through the axis of the cylinder, in which magnetization directions Dm of individual parts are parallel to the axial direction of the cylinder and are in mutually opposite directions. Since this configuration causes formation of an external magnetic field equivalent to that of the magnet 110 within a range of a rotation angle where the magnet 110e and the Hall IC 100 overlap in a plan view with the axis of the cylinder as a normal line, the magnet 110e may be replaced with the magnet 110e when being used within the above-described range of the rotation angle. Further, the magnet 110e can be used as the magnet 110A of the second embodiment. The magnet 110e may be formed not only in a semicircle but also at any angle. The rotation angle can be detected with a rotation angle at which the magnet 110e and the Hall IC 100 overlap in a plan view with the axis of the cylinder as a normal line.

Although the illustrated magnets 110, 110a to 110e, 110a1 and 110a2 are columnar or cylindrical, the shape of the magnets may be any polygonal column shape and is not limited as long as the magnetic flux density to be detected by the rotation angle detector 1 or 1A can periodically change and the rotation angle can be uniquely determined with the change.

Further, the Hall IC 100 and the Hall IC 100A may be arranged as follows.

Figure 13A:
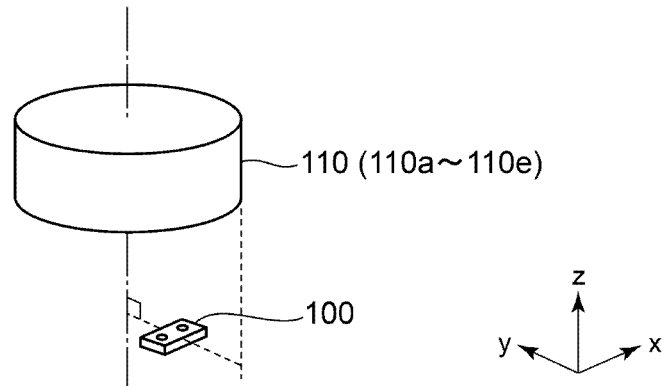
FIGS. 13(a) to 13(c) are perspective views showing modified examples of an arrangement of the Hall IC.
Figure 13B:
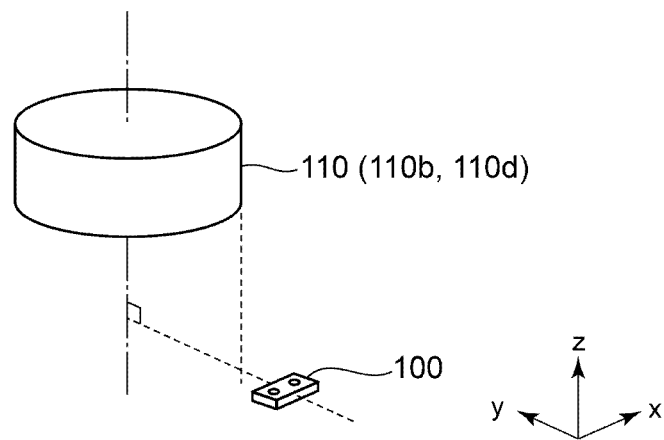
Figure 13C:
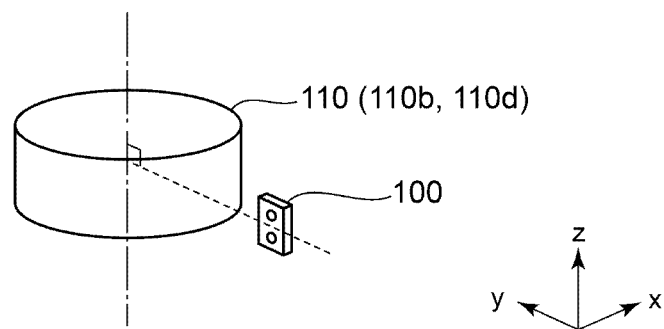

FIGS. 13(a) to 13(c) are perspective views showing modified examples of an arrangement of the Hall IC 100. The arrangement of the Hall IC 100 with respect to the magnet 110 shown in FIG. 13(a) is same as that in the first embodiment. It is shown for comparison with modified examples of other arrangements of the Hall IC 100. In this arrangement the magnet 110 may be the magnet 110a (FIG. 10(b)), the magnet 110b (FIG. 11(a)), the magnet 110c (FIG. 11(b)), the magnet 110d (FIG. 12(a)) or the magnet 110e (FIG. 12(b)). The arrangement of the Hall IC 100 with respect to the magnet 110 shown in FIG. 13(b) is same as the first embodiment and the second embodiment in that the arrangement of the Hall IC 100 is offset from the axis of the cylindrical column of the magnet 110. However, it is different in that the offset amount is larger than a radius of the cylindrical column and the magnet 110 and the Hall IC 100 do not overlap each other, even when the magnet 110 is rotated in a plan view in which the axis of the cylindrical column is a normal line. In this arrangement the magnet 110 may be the magnet 110b (FIG. 11(a)) or the magnet 110d (FIG. 12(a)). The arrangement of the Hall IC 100 with respect to the magnet 110 shown in FIG. 13(c) is same as the first embodiment and the second embodiment in that the arrangement of the Hall IC 100 is offset from the axis of the cylindrical column of the magnet 110. However, it is different in that the offset amount is larger than a radius of the cylindrical column, the magnet 110 and the Hall IC 100 do not overlap each other even when the magnet 110 is rotated in a plan view in which the axis of the cylindrical column is a normal line, the magnetic detection direction of the Hall IC 100 is the circumferential direction of the magnet 110 and the arrangement in z direction is between an upper surface and a bottom surface of the cylindrical column of the magnet 110. In this arrangement the magnet 110 may be the magnet 110b (FIG. 10(b)) or the magnet 110d (FIG. 12(a)).

Moreover, the magnet 110 and the magnet 110A may be replaced with the following, in accordance with a rotation angle to be detected by the rotation angle detector 1 and the rotation angle detector 1A.

Figure 14A:
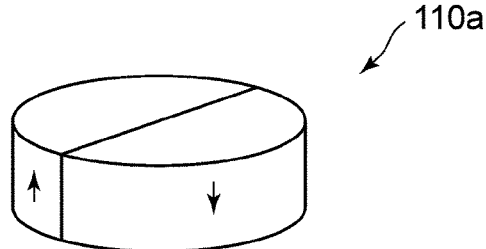
FIGS. 14(a) to 14(c) illustrate perspective views showing modified examples of a detection angle and a magnetization direction of the magnet.
Figure 14B:
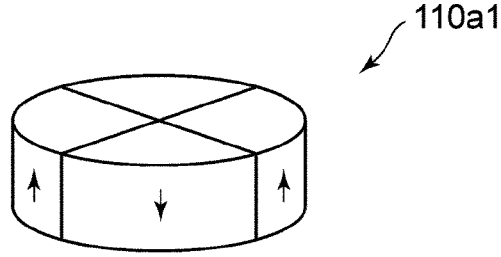
Figure 14C:
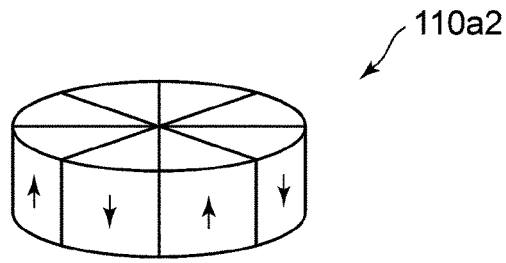

FIGS. 14(a) to 14(c) are perspective views showing modified examples of a detection angle and a magnetization direction of the magnet. The magnet 110a shown in FIG. 14(a) is same as the magnet 110a shown in FIG. 10(b). It is shown for comparison with modified examples of other magnets. The magnet 110a is obtained by dividing a columnar shape into two parts by a plane passing through the axis of a cylindrical column (division: ½). Magnetization directions Dm of individual parts are parallel to the axial direction of the cylindrical column and are in mutually opposite directions. As shown in the first embodiment, the rotation angle that can be detected by the rotation angle detector 1 by using this magnet 110a is 360°. A magnet 110a1 shown in FIG. 14(b) is obtained by dividing a columnar shape into four parts by a plane passing through the axis of a cylindrical column (division: ¼). Magnetization directions Dm of individual parts are parallel to the axial direction of the cylindrical column and are in mutually opposite directions. Since the magnetic field formed by the magnet 110a1 at a magnetic detection position of the Hall IC 100 has a period of 180°, the rotation angle that can be detected by the rotation angle detector 1 by using the magnet 110a1 is 180°. A magnet 110a2 shown in FIG. 14(c) is obtained by dividing a columnar shape into eight parts by a plane passing through the axis of a cylindrical column (division: ⅛). Magnetization directions Dm of individual parts are parallel to the axial direction of the cylindrical column and are in mutually opposite directions. Since the magnetic field formed by the magnet 110a2 at a magnetic detection position of the Hall IC 100 has a period of 90°, the rotation angle that can be detected by the rotation angle detector 1 by using the magnet 110a2 is 90°.

A relationship between the number of divisions and the detection angles shown in FIGS. 14(a) to 14(c) described above is similarly applied to the magnet 110 (FIG. 10(a)), the magnet 110b (FIG. 11(a)) and the magnet 110c FIG. 11(b)). Further, in the case of the magnet 110d (FIG. 12(a)) or the magnet 110e (FIG. 12(b)), the detection angle is further halved.

Although the magnets 110a, 110c, 110e, 110a1 and 110a2 described above have different magnetization directions for individual parts of the magnet, a plurality of magnets may be prepared and arranged such that the magnetization directions of the adjacent magnets are different from each other. The whole of the magnets may be molded with resin or the like so as to generate the same magnetic field.

The third embodiment is different from the first embodiment in that a pair of Hall plates configured to detect a magnetic flux density in y direction is added and a rotation angle of a magnet is detected based on a difference in the magnetic flux density in y direction and a difference in the magnetic flux density in x direction. A Hall IC of the third embodiment is applied to the rotation angle detector 1 of the first embodiment. Moreover, the Hall IC of the third embodiment may be applied to the rotation angle detector 1A of the second embodiment.

Figure 15A:
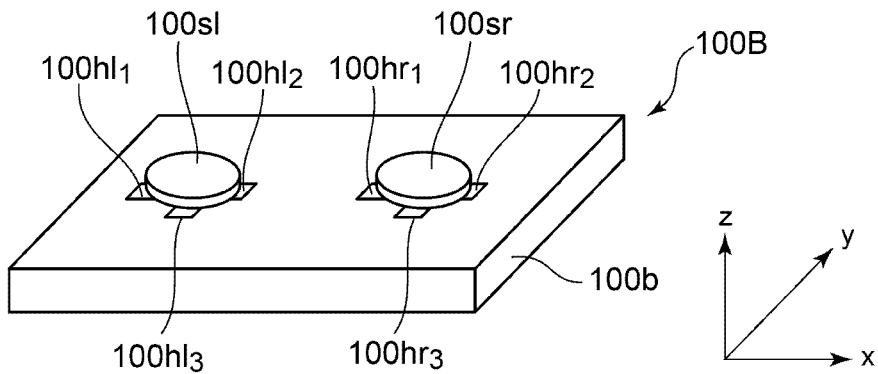
FIGS. 15(a) to 15(c) are a perspective view, a plan view and a cross-sectional view showing a configuration of the Hall IC, according to a third embodiment.
Figure 15B:
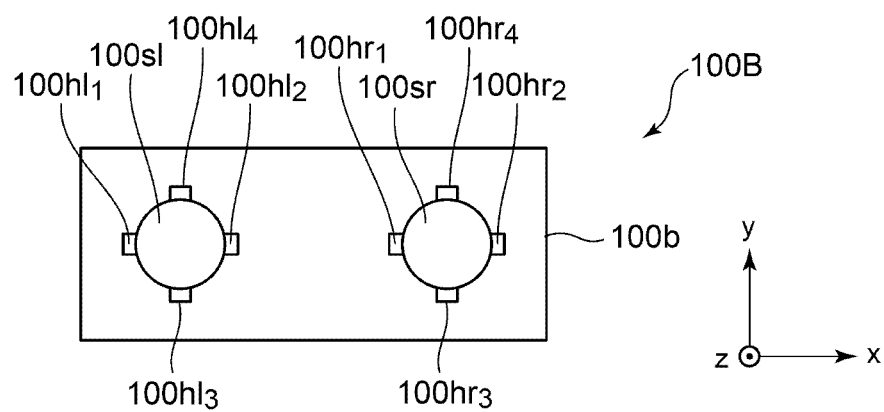
Figure 15C:
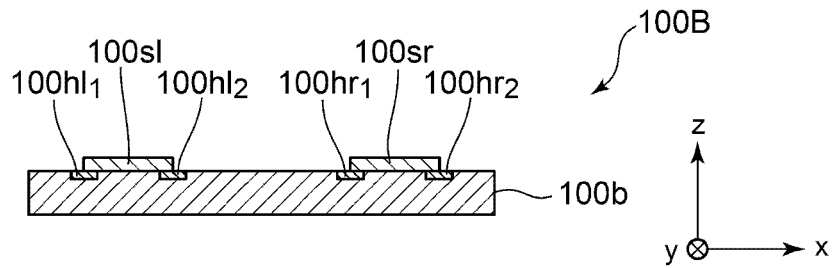

FIGS. 15(a) to 15(c) are a perspective view, a plan view and a cross-sectional view showing a configuration of the Hall IC, according to the third embodiment. The Hall IC 100B comprises: a substrate 100b; two pairs of magnetic detection elements (a first set of two pairs of magnetic detection elements) consisting of Hall plates $100hl_1$ and $100hl_2$ (also collectively referred to as a Hall plate $100hlx$) and Hall plates $100hl_3$, $100hl_4$ (also collectively referred to as a Hall plate $100hly$) and two pairs of magnetic detection elements (a second set of two pairs of magnetic detection elements) consisting of Hall plates $100hr_1$ and $100hr_2$ (also collectively referred to as a Hall plate $100hrx$) and Hall plates $100hr_3$, $100hr_4$ (also collectively referred to as a Hall plate $100hry$), being provided on the substrate 100b to have a detection surface parallel to the surface of the substrate 100b and having a detection direction in a normal direction of the surface of the substrate 100b; a magnetic concentrator $100sl$ provided on the substrate 100b to overlap on a part of each of the Hall plates $100hlx$ and $100hly$ and configured to convert magnetic flux in the direction orthogonal to the normal direction into the normal direction to allow the magnetic flux to be detected by the Hall plates Hall plates $100hlx$ and $100hly$; a magnetic concentrator $100sr$ provided on the substrate 100b to overlap on a part of each of the Hall plates $100hrx$ and $100hry$ and configured to convert magnetic flux in the direction orthogonal to the normal direction into the normal direction to allow the magnetic flux to be detected by the Hall plates Hall plates $100hrx$ and $100hry$; and a signal processing part configured to process signals output from the Hall plates $100hlx$, $100hly$, $100hrx$, and $100hry$, in which the Hall IC 100B detects magnetic flux densities in x and y directions through signal processing described next.

A detection operation for the magnetic flux density in y direction is same as the detection operation for the magnetic flux density in x direction described in FIG. 6 and is explained by setting By for horizontal component B// of the drawing of magnetic flux f.

Figure 16A:
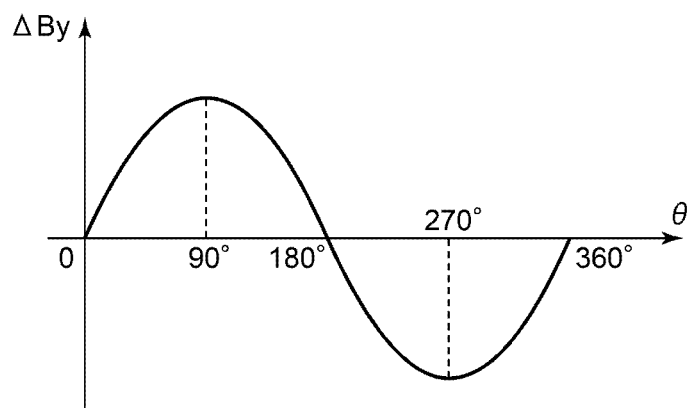
FIGS. 16(a) and 16(b) illustrates graphs showing outputs ΔBy and ΔBx of the Hall IC, each relative to a rotation angle of the magnet.
Figure 16B:
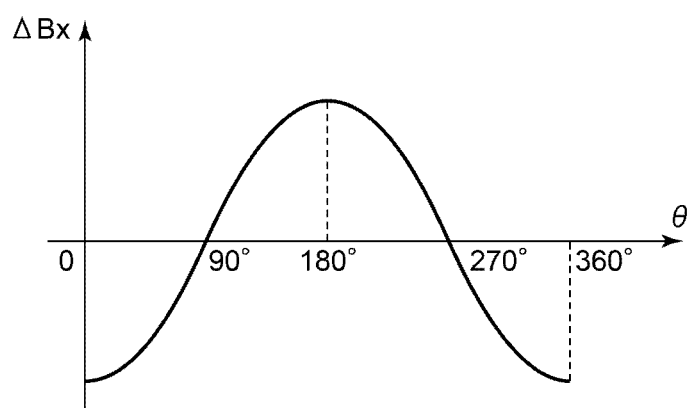

FIGS. 16(a) and 16(b) are graphs showing outputs ΔBy and ΔBx of the Hall IC, each relative to the rotation angle of the magnet. Since a relationship between the rotation angle of the magnet and the magnetic field to be formed is same as that in the first embodiment, the description is given with reference to FIGS. 7(a1) to 7(a5) and 7(b1) to 7(b5).

When the rotation angle of the magnet 110 is θ=0° (FIGS. 7(a1) and 7(b1)), magnetic fields Byl and Byr respectively detected by the Hall plate $100hly$ and the Hall plate $100hry$ have same numerical values. Therefore, ΔBy=0. Moreover, magnetic fields Bxl and Bxr respectively detected by the Hall plate $100hlx$ and the Hall plate $100hrx$ have same numerical values with reverse signs. Therefore, ΔBx has a negative maximum value.

Next, when the rotation angle of the magnet 110 is θ=90° (FIGS. 7(a3) and 7(b3)), magnetic fields Byl and Byr respectively detected by the Hall plate $100hly$ and the Hall plate $100hry$ have same numerical values with reverse signs. Therefore, ΔBy has a positive maximum value. Moreover, magnetic fields Bxl and Bxr respectively detected by the Hall plate $100hlx$ and the Hall plate $100hrx$ have same numerical values. Therefore, ΔBx=0.

Next, when the rotation angle of the magnet 110 is θ=180° (FIGS. 7(a5) and 7(b5)), magnetic fields Byl and Byr respectively detected by the Hall plate $100hl$ and the Hall plate $100hr$ have same numerical values. Therefore, ΔBy=0. Moreover, magnetic fields Bxl and Bxr respectively detected by the Hall plate $100hlx$ and the Hall plate $100hrx$ have same numerical values with reverse signs (opposite to the case of θ=0°). Therefore, ΔBx has a positive maximum value.

Considering the behaviour of ΔBy and ΔBx above, transition states θ=45° (FIGS. 7(a2) and 7(b2)), θ=135° (FIGS. 7(a4) and 7(b4)), and θ=180° to 360°, a relationship between rotation angle θ of the magnet 110 and ΔBy and ΔBx is such that ΔBy is proportional to sin θ, and ΔBx is proportional to cos θ, as shown in FIGS. 16(a) and 16(b).

Namely, $\Delta By/\Delta Bx = k' \cdot \sin\theta/\cos\theta = k' \cdot \tan\theta$, so that $\theta = \arctan(K' \cdot \Delta By/\Delta Bx)$. Note that k' is a constant for normalizing a magnitude of the amplitude of $\Delta By$ and $\Delta Bx$, and K' is the reciprocal of k'.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A rotation angle detector comprising:
a magnet arranged to rotate around a rotation axis; and
a magnetic detection circuit provided with;
   a first pair of magnetic detection elements arranged to be sensitive to a first magnetic field in circumferential direction to said rotation axis and to a second magnetic field in normal direction to said first magnetic field and arranged away from said rotation axis, and configured to detect magnetic flux of said magnet;
   a second pair of magnetic detection elements arranged to be sensitive to said first magnetic field in circumferential direction to said rotation axis and to said second magnetic field in normal direction to said first magnetic field, wherein said second pair of magnetic detection elements is arranged with a predetermined interval from said first pair of magnetic detection elements in the circumferential direction to said rotation axis; and
   a signal processing unit configured to output a signal representative of a rotation angle of said magnet based on outputs of said first and said second pair of magnetic detection elements.

2. The rotation angle detector as in claim 1, wherein said signal processing unit is arranged to determine a first magnetic flux density difference in said normal direction and a second magnetic flux density difference in said circumferential direction, from outputs of said first pair of magnetic detection elements and said second pair of magnetic detection elements, and to output a signal representative of said rotation angle of said magnet based on said first and said second magnetic flux density difference.

3. The rotation angle detector as in claim 2, wherein said signal processing unit is arranged to determine a maximum value of an amplitude of said first magnetic flux density difference and a maximum value of an amplitude of said second magnetic flux density difference based on a rate of change in said amplitudes of said first and said second magnetic flux density difference, and arranged to normalize said amplitudes of said first and said second magnetic flux density difference in accordance with the maximum values of said amplitudes of said first and said second magnetic flux density difference.

4. The rotation angle detector as in claim 1, wherein said first pair of magnetic detection elements is replaced by a first set of two pairs of magnetic detection elements and said second pair by a second set of two pairs of magnetic detection elements.

5. The rotation angle detector as in claim 4, wherein said signal processing unit is arranged to determine, from outputs of said first set of two pairs of magnetic detection elements and said second set of two pairs of magnetic detection elements, a third magnetic flux density difference in a radial direction of said rotation and a second magnetic flux density difference in said circumferential direction of said rotation, and to output a signal representative of said rotation angle of said magnet, based on said third magnetic flux density difference and said second magnetic flux density difference.

6. The rotation angle detector as in claim 5, wherein said signal processing unit is arranged to determine a maximum value of an amplitude of said third magnetic flux density difference and a maximum value of an amplitude of said second magnetic flux density difference based on a rate of change in said amplitudes of said third magnetic flux density difference and said second magnetic flux density difference, and arranged to normalize said amplitude of said third magnetic flux density difference and said amplitude of said second magnetic flux density difference in accordance with said maximum value of said amplitude of said third magnetic flux density difference and said maximum value of said amplitude of said second magnetic flux density difference.

7. The rotation angle detector as in claim 1, wherein said magnet has a magnetization direction in a direction orthogonal to said rotation axis.

8. The rotation angle detector as in claim 1, wherein said magnet is divided into two parts by a plane passing through said rotation axis and said two parts are parallel to said rotation axis direction and magnetized in mutually opposite directions.

9. The rotation angle detector as in claim 1, wherein said magnet is divided into a plurality of parts by a plane passing through said rotation axis in accordance with a rotation angle to be detected, and said plurality of parts are parallel to said rotation axis direction and magnetized in mutually opposite directions.

10. The rotation angle detector as in claim 1, wherein said magnet is formed only at a partial angle around a central axis.

11. The rotation angle detector as in claim 1, wherein said magnetic detection elements of said first pair are arranged in a region overlapping with said magnet.

12. The rotation angle detector as in claim 1, wherein said magnetic detection elements of said first pair are arranged in a region not overlapping with said magnet.

13. An attitude control device comprising the rotation angle detector as in claim 1.

14. An automatic steering device comprising a rotation angle detector as in claim 1.

15. A throttle device comprising a rotation angle detector as in claim 1.

* * * * *